US006510150B1

United States Patent
Ngo

(10) Patent No.: US 6,510,150 B1
(45) Date of Patent: Jan. 21, 2003

(54) METHOD OF MAC SYNCHRONIZATION IN TDMA-BASED WIRELESS NETWORKS

(75) Inventor: Chiu Y. Ngo, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/217,470

(22) Filed: Dec. 21, 1998

(51) Int. Cl.$^7$ .................................................. H04J 3/06
(52) U.S. Cl. .................... 370/347; 370/350; 370/395.1; 370/503
(58) Field of Search ............... 370/235, 295, 370/310, 312–314, 321, 324, 326, 328, 336, 345, 347, 349, 350, 389, 395.1, 395.4, 395.62, 442, 458, 503, 508, 509

(56) References Cited

U.S. PATENT DOCUMENTS

| | | | |
|---|---|---|---|
| 5,475,681 A | 12/1995 | White et al. | |
| 5,517,505 A | 5/1996 | Buchholz et al. | |
| 5,642,354 A | 6/1997 | Spear | 370/329 |
| 5,666,358 A | 9/1997 | Paratore et al. | 370/347 |
| 5,966,387 A * | 10/1999 | Cloutier | 370/516 |
| 6,026,074 A * | 2/2000 | Stadler et al. | 370/230 |
| 6,032,261 A * | 2/2000 | Hulyalkar | 713/400 |
| 6,115,422 A * | 9/2000 | Anderson et al. | 375/240 |
| 6,137,441 A * | 10/2000 | Dai et al. | 342/357.16 |
| 6,157,646 A * | 12/2000 | Nichols | 370/395 |
| 6,198,728 B1 * | 3/2001 | Hulyalkar et al. | 370/280 |
| 6,310,866 B1 * | 10/2001 | Kronestedt et al. | 370/330 |
| 6,347,084 B1 * | 2/2002 | Hulyalkar et al. | 370/347 |

OTHER PUBLICATIONS

"ATM Wireless Access for Mobile Multimedia . . " M. Umehira Et Al, IEEE Personal Communications Oct. 1996, p. 39–48.

* cited by examiner

Primary Examiner—Hassan Kizou
Assistant Examiner—Ahmed Elallam

(57) ABSTRACT

A method for synchronizing timestamps in a network (e.g., a wireless ATM network) that includes a control node and a plurality of other nodes that communicate with one another over a common channel mediated by a medium-access control subsystem (e.g., one that uses a reservation-based TDMA protocol). At the control node, when a timestamp command is sent from MAC to PHY over the MAC-PHY interface, the current timestamp value at the control node is captured from the MAC-PHY interface. The captured timestamp value is then added by a timestamp update interval, T, and stored to become the timestamp value included in the next timestamp transmission exactly T seconds later. At each other node, when the timestamp command is received by PHY and sent to MAC over the MAC-PHY interface, the current timestamp value at the respective other node is captured from the MAC-PHY interface. The captured timestamp value is then compared with the timestamp value contained in the timestamp command and the difference, if any, is stored in an offset_register. This offset value will later be added to the timestamp counter in a non-time-critical manner under software control before the arrival of the next timestamp command.

6 Claims, 2 Drawing Sheets

METHOD OF MAC SYNCHRONIZATION IN TDMA-BASED WIRELESS NETWORKS

BACKGROUND OF THE INVENTION

The present invention relates generally to systems and methods that enable multiple-access of the same channel in a network, and, more particularly, to a system and method of timestamp synchronization in a network that employs a reservation-based TDMA protocol.

In general, communications networks, particularly wireless networks, typically employ a multiple-access protocol that is designed to prevent collisions of data packets due to simultaneous transmission of the data packets by multiple transmitters in the network using the same channel. One protocol that has come into widespread use is known as Time-Division Multiple Access (TDMA). A detailed description of this technique can be found in the reference book *Telecommunications Networks: Protocols, Modeling and Analysis,* Addison-Wesley, 1997. In general, in accordance with the TDMA protocol, channel time is divided into small time slots, each of which is assigned to a different node (user). This time slot assignment can either be fixed (classical TDMA), or variable (reservation-based TDMA). In either case, since the number of nodes (users) is finite the data is usually transmitted in TDMA "frames", which ensure that the delays encountered by the different users are finite.

For example, in fixed-assignment TDMA, the TDMA frame consists of the total number of slots assigned to all users, after which the TDMA frame repeats. In the case of reservation-based TDMA, a natural framing occurs in terms of different "phases" of the TDMA frame, consisting typically of a "control" phase in which reservations are requested and assigned, and a "data" phase in which the data is transmitted by the different users in their respective assigned time slots.

It is necessary that all transmitters and receivers in the TDMA network be synchronized in terms of the TDMA frame. An incorrectly synchronized transceiver, at best, cannot communicate, but, at worst, can cause the entire TDMA network to collapse if appropriate safeguards are not built into the protocol. It should be recognized that TDMA frame synchronization is not the same as clock synchronization of a modem, which is a function of the Physical layer (PHY). Usually, frame synchronization is achieved using a centralized control strategy implemented by a central controller (CC). However, frame synchronization can also be implemented in a distributed fashion.

In most TDMA networks, a universal time reference is required to properly allocate resources for transmission. This universal time reference is usually provided in the form of a "timestamp", e.g., which specifies the current time. The timestamps are broadcast periodically by the central controller, and are used by the end terminals (WTs) to synchronize their "timestamp" registers.

For variable-sized TDMA frames, synchronization achieved through the use of timestamps typically requires the utilization of a phase-locked loop (PLL) in each of the WTs, which can be quite complex. Further, the PLLs used for this purpose must be redesigned whenever the parameters of the timestamp scheme are changed, for example, when the frequency of timestamp transmission is changed. In this connection, a generic synchronization scheme is desired in order to enable an WT to be used interchangeably within many different networks.

Most protocols have an interval during which the timestamp update must be sent. Otherwise, the timing jitter may be larger than what can be handled by a particular application, e.g., an MPEG decoder. For a reservation-based TDMA protocol, there are many problems with the timestamp-based approach. The first problem is that the transmission of the timestamp value must also be reserved, and subsequently, other data must also be queued for transmission. In order to ensure efficient use of processor resources (which must be used for managing many other functions), this queuing is usually scheduled in advance. However, the timestamp value cannot be obtained until the exact time of transmission. Further, the queuing of the data packets behind the timestamp value cannot be done before the timestamp value is obtained. Of course, it is possible to switch the data stream between two separate queues with one holding the timestamp value and the other holding the data. However, this solution is quite complicated and requires precise synchronization.

A more detailed understanding of this problem can be gained by considering the case of a wireless asynchronous transfer mode (ATM) network that uses a reservation-based medium-access control (MAC) protocol. The MAC protocol implementation depends on a periodic control-data-frame (CDF), as described in pending U.S. patent application Ser. No. 08/770,024 filed on Dec. 19, 1996, now U.S. Pat. No. 6,198,728, and incorporated by reference herein. Each CDF contains many phases, during which both control and data information is sent from both the base station (BS) and the wireless terminal (WT). In the context of the implementation shown in the drawings and discussed hereinafter, the BS corresponds to the previously described central controller (CC) and the WT corresponds to the previously described end terminal (WT).

FIG. 1 illustrates the four phase structure, namely, BS_SIG; DN_DATA; UP_DATA; and, E_BURST. A brief description of each of these phases follows:

BS_SIG: During this phase, the BS sends control information for the downlink. The timestamp packet is normally sent during this phase. At the BS, the processor starts the transmission of packets from BS. At the WT, the WT starts the process of reception of packets from the BS.

DN_DATA: During this phase, the BS sends data packets for the WTs. At the BS, the processor is busy interpreting the packets sent by the WT during the UP_DATA phase. At the WT, the processor is busy storing the PHY FIFO for the next burst of transmission during the UP_DATA phase.

UP_DATA: During this phase, the WT sends data and signaling packets for the BS. Signaling is sent using superslots. At the BS, the processor is busy storing the PHY FIFO for the next burst of transmission during the BS_SIG and DN_DATA phases. At the WT, the processor is busy interpreting the packets sent by the BS during the BS_SIG and the DN_DATA phases.

E_BURST: During this phase, the WTs, which have not currently been allocated space for transmission during the UP_DATA phase, indicate whether they want to enter the WATM network. Both the WT and the BS processors are busy implementing the E_BURST phase.

The hardware design is based on the BS and each WT keeping the same timestamp values as a basis for computing the four phases of a CDF. All must maintain the same time periods in order to communicate and transfer packets effectively. All must synchronize their timestamps periodically, by copying the base station value, and all must take starting time directives from the BS.

The MAC processor is assumed to be interrupt-driven for both the WTs and the BS. The BS determines the timing for the entire system. Using the timestamp value as a reference, it determines the exact time when each of the phases operates. This timing information is sent during the BS_SIG phase. Since all phases are successive to each other, the WT and the BS set up a counter for the next phase based on the timing information, which then triggers an interrupt to the processor when the counter overflows. The processor must finish its functions during the respective phase within the time allotted and be prepared for the next phase.

For timestamp synchronization, the BS can be assumed to send a timestamp value during the BS_SIG phase. However, note that the BS is busy storing the PHY_FIFO with the packets intended for transmission during the BS_SIG and DN_DATA phases. However, the timestamp value must be determined during the BS_SIG phase and cannot be obtained during the UP_DATA phase. Consequently, the normal transmission stream must be stopped to allow for the timestamp value to be loaded from the timestamp register during the time of transmission. This solution is not desirable since it conflicts with the direct data path.

It should be appreciated that the problem described above is not due to the particular protocol considered, but is generally due to the reservation-based nature of the protocol, whereby decisions on what is transmitted at particular times are made in advance of those times.

In U.S. patent application Ser. No. 09/086,270, filed on May 28, 1998, now U.S. Pat. No. 6,347,084 the teachings of which are expressly incorporated herein, a two-step method was presented which synchronized timestamps in a network (e.g., a wireless ATM network) that included a control node (BS) and a plurality of other nodes (WTs) which communicate with one another over a common channel mediated by a medium-access control (MAC) subsystem (e.g., one that uses a reservation-based TDMA protocol). Specifically timestamp information is sent from the BS in two steps.

First, a timestamp_get command is sent by the BS at a first time, in response to which the current timestamp value existing in each respective node is stored in a register at each respective node, including the BS and the WTs. Then, at a later time, a timestamp_load command is sent from the BS, which sends the timestamp value stored in the BS register during the previous timestamp_get command.

Upon receipt of the timestamp_load command each of the WTs compare the current value of their respective timestamp counters against a fixed value (e.g. the timestamp value stored in the WT register during the previous timestamp_get command) to determine when to set their sync flag latches, indicating that a correction will take place. All processors poll for these sync flags during the downlink phase of the CDF, and, if set, will detect this event concurrently. The timestamp value correction then takes place during the BS_SIG phase of the next CDF.

All of the WTs, and the BS, look for this header byte at their PHY layer interfaces in order to ensure that all terminals will act on the header byte as close in time as possible. The delay between them is the delay of the physical path only, which is constant. The timestamp value correction is preferably done entirely by hardware, without processor participation, so that the entire process is deterministic.

Although the method discussed in the '270 application provided significant flexibility in the design of software for the MAC protocol by allowing data and timestamp packets to be scheduled for transmission before the actual time of transmission, it incorporated some redundancy internally.

An object of the invention claim herein is to provide an improvement to the invention claimed in the '270 application which will substantially eliminate this redundancy.

SUMMARY OF THE INVENTION

The invention described herein comprises a one-step timestamp update method to distribute the timestamp value among all transceivers in the network. Specifically, it combines the timestamp_get and timestamp_load commands in the two-step method described in the '270 application into a single command, called the timestamp command. At the BS, when the timestamp command is sent from MAC to PHY over the MAC-PHY interface, the current timestamp value at the BS is captured from the MAC-PHY interface. Except at power-on, the timestamp value contained in the timestamp command and the captured timestamp value should be equal. The captured timestamp value is then added by a timestamp update interval, T, and stored to become the timestamp value included in the next timestamp transmission exactly T seconds later. The value of T can be varied at the BS as different physical conditions arise.

At each WT, when the timestamp command is received by PHY and sent to MAC over the MAC-PHY interface, the current timestamp value at the WT is captured from the MAC-PHY interface. The captured timestamp value is then compared with the timestamp value contained in the timestamp command and the difference, if any, is stored in an offset_register. This offset value will later be added to the timestamp counter in a non-time-critical manner under software control before the arrival of the next timestamp command. Using this method, one can achieve MAC synchronization without the additional overhead required using the two step method described, requiring the two commands, timestamp_get and timestamp_load, taught by the '270 application.

The present invention also encompasses networks that implement the above described methods.

DETAILED DESCRIPTION OF A PREFERRED EMBODIMENT OF THE INVENTION

This invention comprises a one-step timestamp update method to distribute a timestamp value among all transceivers in the network. In general, the update interval may not be fixed but for the ease of illustration, in conjunction with the following illustrative table, the update interval will be assumed to be a constant interval T. Values for T can be multiples of the frame rate, for example if the frame rate is 1 ms. an update interval value, T, could be 10 ms. Different physical conditions could, of course, make it more desirable to increase or decrease the time of the chosen update interval T and should be determined as the need arises. The value of T can be varied at the BS.

If the BS and a WT have their MAC clocks operating at frequency $f_{cc}$ and $f_{WT}$ respectively, and for any $\epsilon > 0$, $|f_{cc} - f_{WT}| < \epsilon$, 1. both BS and WT should be synchronized within a finite period of time, i.e., for a global time $t = t_{sync}$, $$TS_{BS}(t) \approx TS_{WT}(t),$$

and,
2. both BS and WT should maintain synchronization between any two timestamp update instances, i.e., for any global time t=$t_{sync}$,
where $T_{max}$ is the maximum interval between two timestamp update instances and $T_g$ is the guard time between two successive transmissions in the MAC protocol and $$|TS_{BS}(t) - TS_{WT}(t)| < \frac{\varepsilon \cdot T_{max}}{f_{cc}} = \delta < T_g,$$

$\delta = \varepsilon T_{max}/f_{cc}$.

TABLE

| Update Cycle | BS TS value sent in Timestamp Command | BS Captured local TS value | WT Captured local TS value | WT TS value received in Timestamp command | WT Offset to be added to the local TS Counter | Comment |
|---|---|---|---|---|---|---|
| 0 | x | u | | | | |
| 1 | u + T | u + T | | | | |
| 2 | u + 2T | u + 2T | v | u + 2T | (u + 2T) − v | WT receives first timestamp command |
| 3 | u + 3T | u + 3T | u + 3T − δ | u + 3T | δ | WT gets in sync. with BS |
| 4 | u + 4T | u + 4T | u + 4T − δ | u + 4T | δ | WT maintains sync. with BS |
| ... | | | | | | |
| N | u + nT | u + nT | u + nT − δ | u + nT | δ | WT maintains sync. with BS |

The capture of the local timestamp value in the WT is done in hardware that is triggered by the timestamp command header byte received from the BS. Therefore, in order to avoid incorrect interpretation of timestamp command before WT gets in sync. with BS, WT will rely on the software to check if the packet received is indeed a timestamp command packet.

In order to simplify the implementation and enhance the reliability of the timestamp interpretation, the following description assumes that if the BS needs to send a timestamp command packet (a header with a timestamp value) for timestamp synchronization, it will send it at the beginning of the BS_SIG phase.

Figure 1:
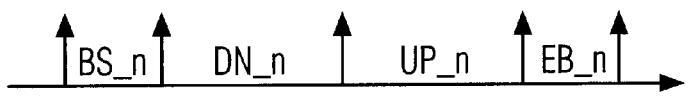
FIG. 1 is a diagram that depicts the structure of a periodic control-data-frame (CDF) used in a reservation-based MAC protocol for a wireless ATM network.
Figure 2:
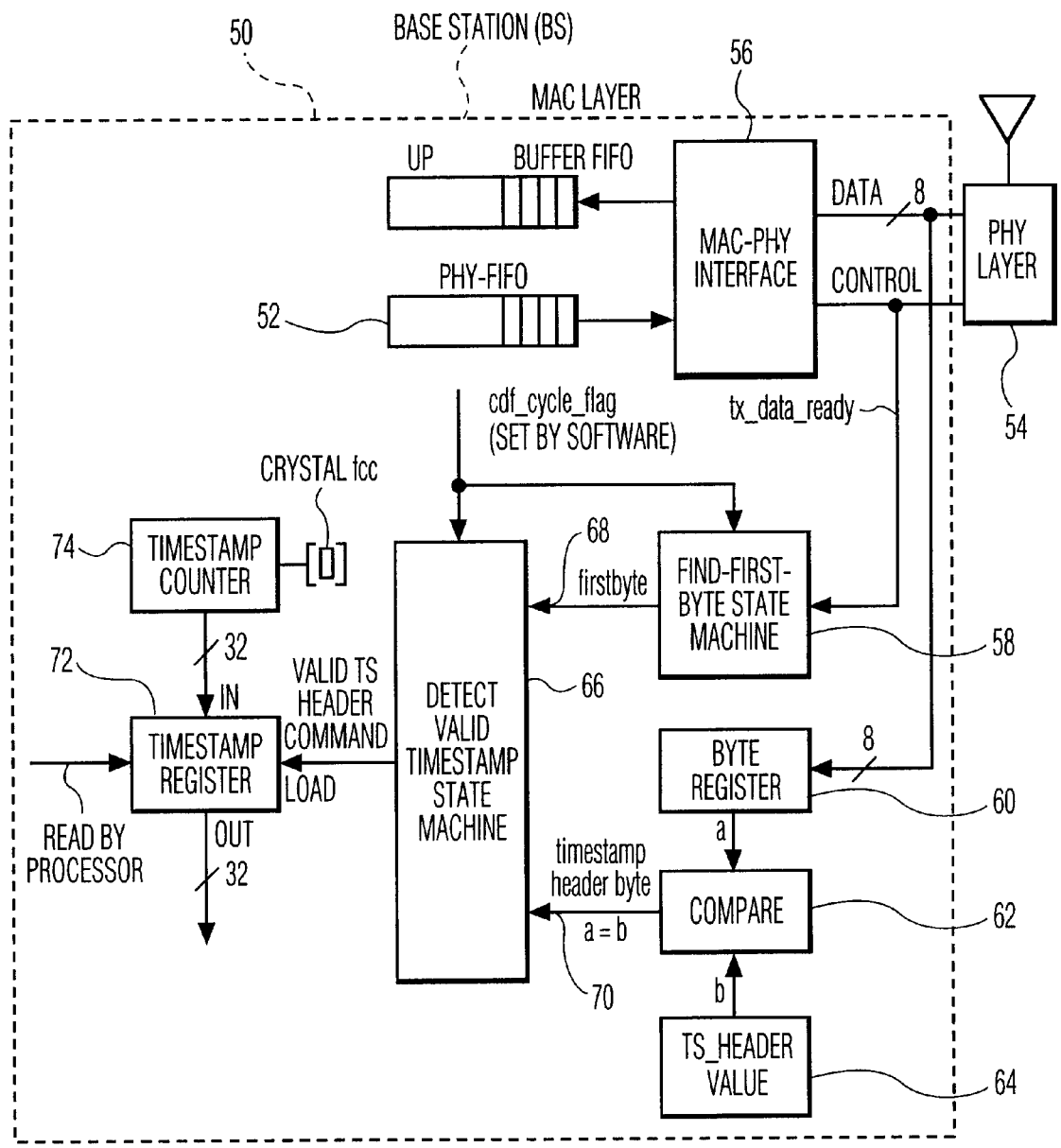
FIG. 2 is a block diagram of the base station (BS) of a MAC subsystem employed in an exemplary implementation of the present invention.

The following preferred embodiment of the invention uses the existing tx_data_ready (sending from MAC to PHY) and rx_data_ready (sending from PHY to MAC) control signals in the MAC-PHY interface for detecting the start of a MAC packet. Note that the tx_data_ready signal is normally high and will go low for a period of a packet when a packet is transmitted from MAC to PHY over the MAC-PHY interface. Likewise, the rx_data_ready signal is normally high and will go low for a period of a packet when a packet is received from PHY over the MAC-PHY interface. FIG. 2 illustrates the the generation of the timestamp command at the base station (BS).

At power-on, the MAC layer 50 will start with a default interrupt-drive cdf_cycle as indicated by the cdf_cycle_flag. The PHY-FIFO 52 is then prepared with an initial timestamp command header byte as the first byte to be transmitted when the designated BS_SIG phase begins. At power-on, the timestamp value (X) in PHY-FIFO 52 will most likely be zero. However, the algorithm does not require it to be that value. It can be an arbitrary value. The point is that it is a starting value which will change as soon as the following processes begin.

The initial timestamp command packet is created by concatenating a timestamp command header (one byte) with the value X+T (four-bytes), where T is a constant representing the timestamp update interval. The rest of the packet is padded with zeros. This timestamp command packet is then sent to the PHY-FIFO 52 which will then be sent to the PHY 54 via the MAC-PHY interface 56, and then transmitted to the WTs at the beginning of the control-data frame (CDF) cycle.

Concurrent with transmission of the timestamp command packet to the PHY layer 54, two circuits are triggered simultaneously. First, if the tx_data_ready signal from the MAC-PHY interface 56 goes "low" and the cdf_cycle_flag is set, a first state machine 58 outputs a "firstbyte" signal for first byte detection. Second, the byte present at the data line of the MAC-PHY interface 56 is captured in byte register 60. The byte is compared in comparator 62 with a stored header identification value 64 for coincidence. When the byte present at on the data line of the MAC-PHY interface 56 is a valid timestamp command header byte, comparator 62 provides the timestamp header byte signal to a second state machine 66. If a "firstbyte" signal from first state machine 58 is present on line 68 at the same time a valid timestamp header byte signal is present on data line 70, the second state machine 6 generates a valid TS header load command signal to timestamp register 72 which causes the current value of timestamp counter 74 to be stored in timestamp register 72. Except at power-on, this value should be the same as the one in the timestamp command packet. Under software control, this value will be incremented by a value corresponding to T and the thus updated timestamp command packet will be retained in timestamp register 72 and provided to PHY-FIFO 52 for the next timestamp command transmission.

Figure 3:
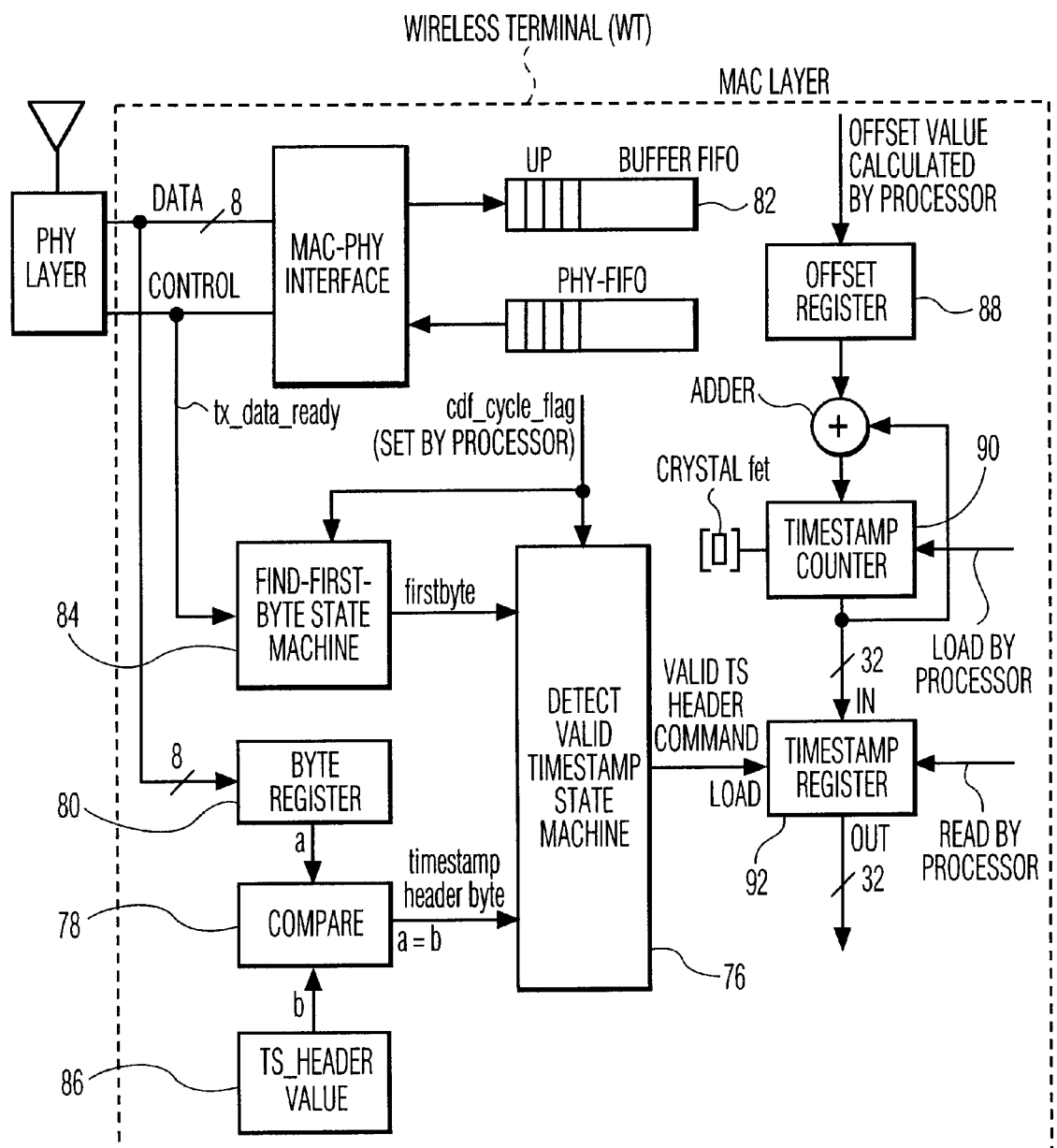
FIG. 3 is a block diagram of a wireless terminal (WT) of a MAC subsystem employed in an exemplary implementation of the present invention.

As shown in FIG. 3, as in the WT there are two circuits for detecting the timestamp command packet; a first state machine 84 (which outputs a "firstbyte" signal when the rx_data_rdy goes "low" and cdf_cycle_flag is set), and a byte comparator 78. At power-on, there will be no interrupt-driven cdf_cycle and the first state machine 84 will be disabled. The data byte received from the PHY will be stored in a FIFO buffer 82. Concurrently, the data byte is also stored in a byte register 80 that will be used for comparison against the stored fixed timestamp command header value 86 in comparator 78. When the comparator 78 detects coincidence, an identical process of read and load as takes place in the base station (described aboved), is initiated. At the same time, the software will scan the data received at the FIFO buffer 82 and check if there is the timestamp command packet. If so, the timestamp value stored in the timestamp command packet will be used to compute corrections for the timestamp counter at the WT. If the WT calculates the difference between the received timestamp_value and its local timestamp value captured in the register 92 and stores this value in the offset_register 88 as shown. Then the processor at the WT then sends a "load" command to timestamp counter 90, which adds the offset value to the current value of the timestamp counter 90 and reloads it into the timestamp counter 90 and timestamp register 92. This process repeats until the offset value becomes substantially zero, i.e., the WT gets in sync with the BS. Then, the WT starts the interrupt-driven cdf_cycle as indicated by the cdf_cycle_flag and enables the first state machine 84 so that correct timestamp command header bytes can be reliably detected. Thereafter, the process will be the same as above. Note that after the interrupt-driven cdf_cycle starts, the software needs to have some intelligence to combat the error packet/byte caused by the noisy wireless channel. If it finds that the offset value is too far from zero, it may need to discard the timestamp update or use the last offset value for correction.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

I claim:

1. A method for synchronizing timestamps in a network that includes a control node and a plurality of other nodes that communicate with one another over a common channel mediated by a medium-access control subsystem, the method including the steps of:

adding a first time interval value to a first value to provide a timestamp value;

storing said timestamp value at said control node for a second time interval substantially equal to said first time interval, sending a timestamp command from the control node to said other nodes, at a first time, wherein said timestamp command comprises said timestamp value;

storing said timestamp value in a register within each of the other nodes, in response to the timestamp command;

wherein each of the other nodes computes a difference between the timestamp value and a current timestamp value, and then increments or decrements said current timestamp value by said computed difference.

2. The method as set forth in claim 1, wherein:

the network is a wireless network;

the control node is a base station; and, each of the other nodes is a wireless terminal.

3. The method as set forth in claim 1, wherein the medium-access control subsystem uses a reservation-based TDMA protcol.

4. The method as set forth in claim 2, wherein the network is a wireless ATM network.

5. The method as set forth in claim 1, wherein any selected one of the nodes in the network can be assigned to serve as the control node at different times.

6. The method as set forth in claim 1, wherein said first time interval value is variable at the control node.

* * * * *